US012475689B2

United States Patent
Li et al.

(10) Patent No.: US 12,475,689 B2
(45) Date of Patent: Nov. 18, 2025

(54) METHOD FOR TRAINING IMAGE GENERATION MODEL, METHOD FOR GENERATING IMAGES, AND DEVICES THEREOF

(71) Applicant: BIGO TECHNOLOGY PTE. LTD., Singapore (SG)

(72) Inventors: An Li, Guangzhou (CN); Yule Li, Guangzhou (CN); Wei Xiang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 300 days.

(21) Appl. No.: 18/263,854

(22) PCT Filed: Jan. 28, 2022

(86) PCT No.: PCT/CN2022/074499
§ 371 (c)(1),
(2) Date: Aug. 1, 2023

(87) PCT Pub. No.: WO2022/166797
PCT Pub. Date: Aug. 11, 2022

(65) Prior Publication Data
US 2024/0119707 A1 Apr. 11, 2024

(30) Foreign Application Priority Data
Feb. 2, 2021 (CN) .......................... 202110143927.0

(51) Int. Cl.
*G06V 10/774* (2022.01)
*G06T 11/60* (2006.01)

(52) U.S. Cl.
CPC ............ *G06V 10/774* (2022.01); *G06T 11/60* (2013.01)

(58) Field of Classification Search
CPC .... G06V 10/774; G06V 10/82; G06V 10/454; G06V 10/764; G06V 40/168;
(Continued)

(56) References Cited

U.S. PATENT DOCUMENTS 10,685,057 B1 * 6/2020 Chavez ................. G06F 16/248
10,970,830 B2 * 4/2021 Zhang ........................ G06T 5/50
(Continued)

FOREIGN PATENT DOCUMENTS

CN 107577985 A 1/2018
CN 108205813 A 6/2018
(Continued)

OTHER PUBLICATIONS

International Search Report of the International Searching Authority for State Intellectual Property Office of the People's Republic of China in PCT application No. PCT/CN2022/074499 issued on Apr. 15, 2022, which is an international application to which this application claims priority.
(Continued)

*Primary Examiner* — Michael S Osinski
(74) *Attorney, Agent, or Firm* — Kolitch Romano Dascenzo Gates LLC

(57) ABSTRACT

Provided is a method for training an image generation model, including: acquiring a first transformation model by training; acquiring a reconstruction model by training based on the first transformation model; acquiring a second transformation model by training; generating a grafted transformation model by grafting the first transformation model with the second transformation model; and generating the image generation model based on the reconstruction model and the grafted transformation model. The first transformation model is configured to generate a first training image according to a first noise sample. The first training image is an
(Continued)

image of a first style. The reconstruction model is configured to map an original image sample to a latent variable corresponding to the original image sample. The second transformation model is configured to generate a second training image according to a second noise sample. The second training image is an image of a second style.

20 Claims, 7 Drawing Sheets

(58) Field of Classification Search
CPC .............. G06T 11/60; G06T 11/001; G06T 2207/10016; G06T 2207/20076; G06T 2207/20081; G06T 2207/20084; G06T 2207/30201; G06T 3/04; G06T 5/50; G06T 5/60; G06T 2207/20016; G06N 3/0455; G06N 3/0475; G06N 3/094; G06N 3/08; G06N 3/045; G06N 3/047; G06N 3/084; G06N 3/02; G06N 3/048
See application file for complete search history.

(56) References Cited

U.S. PATENT DOCUMENTS

| | | | |
|---|---|---|---|
| 10,984,286 B2* | 4/2021 | Dundar | G06V 10/955 |
| 11,024,009 B2* | 6/2021 | Shi | G06T 3/4053 |
| 11,164,059 B2* | 11/2021 | Zhu | G06K 19/06046 |
| 11,508,188 B2* | 11/2022 | Lee | G06N 3/045 |
| 11,977,960 B2* | 5/2024 | Shayani | G06T 11/001 |
| 11,983,850 B2* | 5/2024 | Wang | G06N 3/045 |
| 12,033,374 B2* | 7/2024 | Wang | G06V 10/82 |
| 12,159,372 B2* | 12/2024 | Dahlquist | H04N 13/156 |
| 12,205,341 B2* | 1/2025 | Hu | G06V 10/82 |
| 2018/0357800 A1* | 12/2018 | Oxholm | G06T 11/001 |
| 2019/0279075 A1* | 9/2019 | Liu | G06N 3/047 |
| 2020/0082249 A1 | 3/2020 | Hua et al. | |
| 2020/0202502 A1* | 6/2020 | Tsymbalenko | G06T 5/60 |
| 2020/0311986 A1* | 10/2020 | Tong | G06N 20/20 |
| 2021/0133938 A1* | 5/2021 | Lee | G06N 3/08 |
| 2021/0264234 A1* | 8/2021 | Paris | G06N 3/047 |
| 2021/0365710 A1* | 11/2021 | Zhu | G06T 11/60 |
| 2022/0036635 A1* | 2/2022 | Li | G06T 15/20 |
| 2022/0180189 A1* | 6/2022 | Adrian | G06N 3/047 |
| 2022/0189008 A1* | 6/2022 | Lin | G06V 10/454 |
| 2022/0198228 A1* | 6/2022 | Kuo | G06T 7/0004 |
| 2022/0335250 A1* | 10/2022 | Miao | G06N 3/08 |
| 2022/0374625 A1* | 11/2022 | Chu | G06N 20/10 |
| 2023/0040256 A1* | 2/2023 | Wu | G06T 3/02 |
| 2023/0042734 A1* | 2/2023 | Cao | G06V 20/70 |
| 2023/0102055 A1* | 3/2023 | Park | G06N 3/08 |
| | | | 345/428 |
| 2023/0230242 A1* | 7/2023 | Lorsakul | G06F 18/22 |
| | | | 382/128 |
| 2023/0298148 A1* | 9/2023 | Zhang | G06T 7/194 |
| | | | 382/156 |
| 2023/0316606 A1* | 10/2023 | Qu | G06N 3/0464 |
| | | | 345/619 |
| 2023/0360309 A1* | 11/2023 | Kowalski | G06T 9/002 |
| 2024/0005574 A1* | 1/2024 | Zhang | G06T 7/12 |
| 2024/0005578 A1* | 1/2024 | Chakrabarty | G06T 11/60 |
| 2024/0037805 A1* | 2/2024 | Motiian | G06V 40/168 |
| 2024/0233092 A1* | 7/2024 | Kim | G06T 5/50 |
| 2024/0265503 A1* | 8/2024 | Kim | G06T 5/50 |
| 2025/0005808 A1* | 1/2025 | Yin | G06V 10/774 |
| 2025/0200831 A1* | 6/2025 | Noh | G06V 10/761 |
| 2025/0209701 A1* | 6/2025 | Hwang | G06V 10/774 |

FOREIGN PATENT DOCUMENTS

| | | |
|---|---|---|
| CN | 111508048 A | 8/2020 |
| CN | 111767979 A | 10/2020 |
| CN | 112101172 A | 12/2020 |
| CN | 112862669 A | 5/2021 |
| KR | 20200080408 A | 7/2020 |

OTHER PUBLICATIONS

Extended European Search Report Communication Pursuant to Rule 62 EPC for European Application No. 22749076.0 dated Oct. 4, 2023, which is a foreign counterpart application to this application.

Hao, Guang-Yuan et al., "MIXGAN: Learning Concepts from Different Domains for Mixture Generation", arxiv.org, Cornell University Library, 201OLIN Library Cornell University Ithaca, NY 14853, Jul. 4, 2018, XP081110981, the whole document.

* cited by examiner

METHOD FOR TRAINING IMAGE GENERATION MODEL, METHOD FOR GENERATING IMAGES, AND DEVICES THEREOF

CROSS-REFERENCE TO RELATED APPLICATIONS

The present disclosure is a U.S. national stage of international application No. PCT/CN2022/074499, field on Jan. 28, 2022, which claims priority to Chinese Patent Application No. 202110143927.0, filed on Feb. 2, 2021, and entitled "METHOD AND APPARATUS FOR TRAINING IMAGE GENERATION MODEL, METHOD AND APPARATUS FOR GENERATING IMAGES, AND DEVICES THEREOF," the contents of which are herein incorporated by reference in their entireties.

TECHNICAL FIELD

Embodiments of the present disclosure relate to the technical field of machine learning and image processing, and in particular, relates to a method for training an image generation model, a method for generating images, and devices thereof.

BACKGROUND

Machine learning has been widely used in the technical field of image processing. For example, changing styles of images can be done based on machine learning.

SUMMARY

Some embodiments of the present disclosure provide a method for training an image generation model, a method for generating images, and devices thereof. The technical solutions are as follows.

According to one aspect of the embodiments of the present disclosure, a method for training an image generation model is provided. The method includes:
  acquiring a first transformation model by training, wherein the first transformation model is configured to generate a first training image according to a first noise sample, the first training image being an image of a first style;
  acquiring a reconstruction model by training based on the first transformation model, wherein the reconstruction model is configured to map an original image sample to a latent variable corresponding to the original image sample;
  acquiring a second transformation model by training, wherein the second transformation model is configured to generate a second training image according to a second noise sample, the second training image being an image of a second style;
  generating a grafted transformation model by grafting the first transformation model with the second transformation model; and
  generating the image generation model based on the reconstruction model and the grafted transformation model, wherein the image generation model is configured to transform an image to be transformed of the first style into a target image of the second style.

According to another aspect of the embodiments of the present disclosure, a method for generating images is provided. The method includes:
  generating a latent variable corresponding to an image to be transformed by inputting the image to be transformed of a first style into a reconstruction model; and
  generating, based on the latent variable corresponding to the image to be transformed, a target image corresponding to the image to be transformed using a grafted transformation model, wherein the target image is an image of a second style;
  wherein the grafted transformation model is a model generated by grafting a first transformation model with a second transformation model, the first transformation model is configured to generate an image of the first style according to a first noise sample, and the second transformation model is configured to generate an image of the second style according to a second noise sample.

According to still another aspect of the embodiments of the present disclosure, a computer device is provided. The computer device includes a processor and a memory. The memory stores one or more computer programs therein. The one or more computer programs, when loaded and run by the processor of the computer device, cause the computer device to perform the method for training the image generation model as described above, or perform the method for generating the images as described above.

According to still another aspect of the embodiments of the present disclosure, a non-volatile computer-readable storage medium storing one or more computer programs therein is provided. The one or more computer programs, when loaded and run by a processor, cause the processor to perform the method for generating the image generation model as described above, or perform the method for generating the images as described above.

According to still another aspect of the embodiments of the present disclosure, a computer program product is provided. The computer program product, when loaded and executed by a processor, causes to perform the method for training the image generation model as described above, or perform the method for generating the images as described above.

DETAILED DESCRIPTION

In some practices of processing images based on machine learning, a large number of training sample pairs are first acquired. Each of the training sample pairs includes a real face image and a corresponding face comic image. Then, large number of iterative trainings are performed directly on a learning model using a large number of training sample pairs, and the trained learning model is an image generation model. The training of the image generation model in this manner requires a large amount of samples and training process is time consuming.

Face transformation is one of the common image processing methods in computer vision. The image generation model trained by using the method according to the embodiments of the present disclosure is applicable to a target application (such as a video application, a social application, a live streaming application, a shopping application, or an image processing application). A transformed target image is generated by inputting an image to be transformed (a picture or a video) into the target application. The image generation model is written to the target application, or to a server that provides background services to the target application. Optionally, the face transformation is applicable to scenarios such as caricaturing faces, stylizing faces, and editing face attributes (such as changing the age or the gender from the vision), which are not specifically limited herein.

In the method according to some embodiments of the present disclosure, each step is performed by a computer device, which is an electronic device having capabilities of calculating, processing, and storing data. The computer device is a terminal, such as a personal computer (PC), a tablet computer, a smartphone, a wearable device, an intelligent robot, or the like, or a server. The server is an independent physical server, a server cluster, or a distributed system consisting of a plurality of physical servers, or a cloud server providing cloud computing services.

The technical solutions of the present disclosure are described and illustrated hereinafter by several embodiments.

Figure 1:
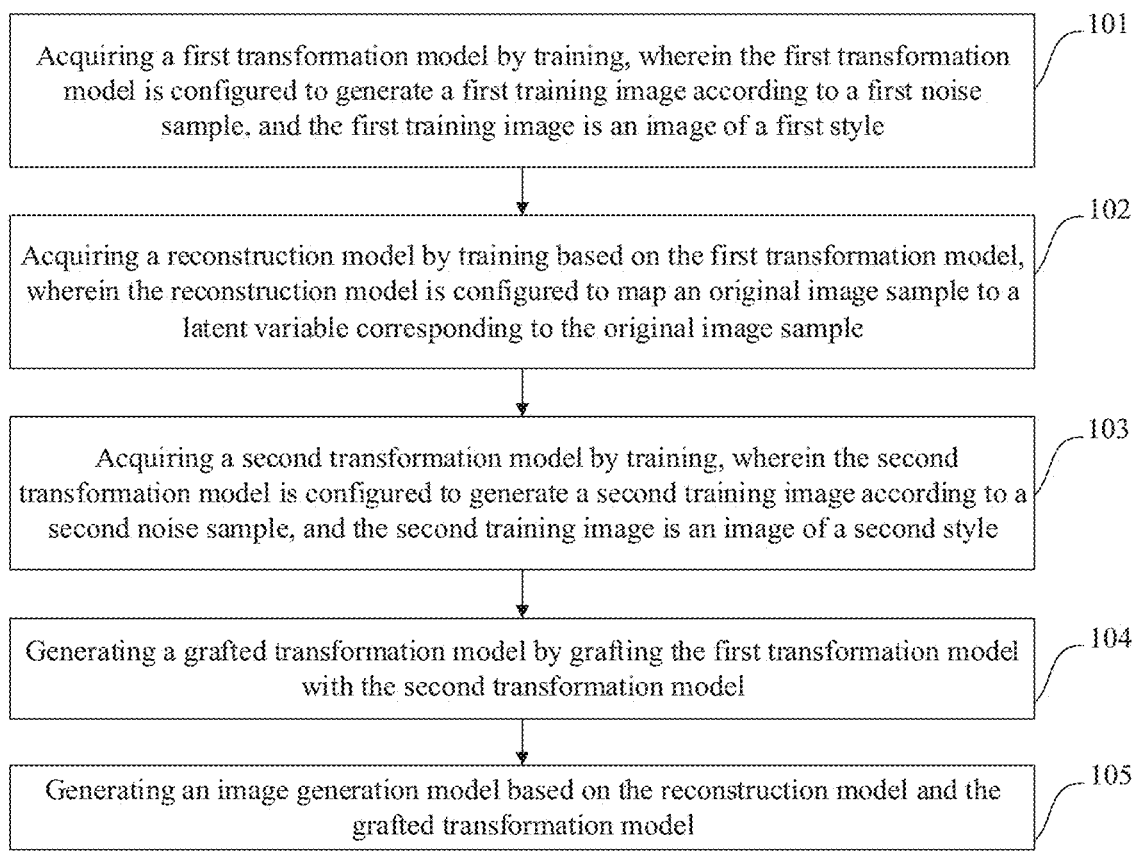
FIG. 1 is a flowchart of a method for training an image generation model according to some embodiments of the present disclosure.

FIG. 1 is a flowchart of a method for training an image generation model according to some embodiments of the present disclosure. Referring to FIG. 1, in the embodiments, the description is given using a scenario where the method is applicable to the computer device described above as an example. The method includes the following steps (step 101 to step 105).

In step 101, a first transformation model is acquired by training. The first transformation model is configured to generate a first training image according to a first noise sample. The first training image is an image of a first style.

In some embodiments, the corresponding first training image is acquired by inputting the first noise sample into the first transformation model, and then parameters of the first transformation model are adjusted based on the corresponding first training image. Thereafter, the next iterative training is performed on the first transformed model by inputting the remaining first noise samples into the first transformation model until the training of the first transformation model is completed. The first noise sample is vectorized and input into the first transformation model in vector form or matrix form.

In the embodiments, the first transformation model is configured to generate the first training image that conforms to a first feature. The first feature is a feature of a person, an object, or a scene that objectively exists. In some examples, the first feature is a real face feature. That is, the first training image is an image that simulates a real face. In the training process, a weight parameter of the first transformation model is adjusted by discriminating a possibility that the face in the first training image conforms to the real face feature, such that the first transformation model is capable of generating an image that conforms to the real face feature.

Optionally, the first noise sample is a randomly generated noise. In some embodiments, a probability density function of the first noise sample subjects to the Gaussian distribution.

In step 102, a reconstruction model is acquired by training based on the first transformation model. The reconstruction model is configured to map an original image sample to a latent variable corresponding to the original image sample.

Optionally, the latent variable is a variable that fails to be observed. In some embodiments, the reconstruction model is capable of mapping, by encoding, the original image sample to the corresponding latent variable, such that the high-dimensional original image sample is transformed into the lower-dimensional latent variable, which reduces computational complexity and computation time of the model, and thus the time cost of training the model is further reduced.

In step 103, a second transformation model is acquired by training. The second transformation model is configured to generate a second training image according to a second noise sample. The second training image is an image of a second style.

In some embodiments, the corresponding second training image is acquired by inputting the second noise sample into the second transformation model, and then parameters of the second transformation model are adjusted based on the corresponding second training image. Thereafter, the next iterative training is performed on the second transformed model by inputting the remaining second noise samples into the second transformation model until the training of the second transformation model is completed.

In the embodiments, the second style is a comic style (such as a pop comic style or a sketch comic style), an ink painting style, a brush painting style, an oil painting style, a watercolor painting style, a drawing style, an abstract painting style, or an image painting style, which is not limited herein.

Optionally, during the training process, an initial weight parameter of the second transformation model is the weight parameter of the first transformation model. That is, the second transformation model is further acquired by training based on the first transformation model.

In step 104, a grafted transformation model is generated by grafting the first transformation model with the second transformation model.

Optionally, the grafted transformation model is generated by grafting different portions of the weight parameters respectively selected from the first transformation model and the second transformation model. The grafted transformation model has both the characteristic of the first transformation model to generate or maintain the first feature of the image and the characteristic of the second transformation model to generate the image of the second style.

In some embodiments, the grafted transformation model is generated by grafting n layers of weight network in a plurality of layers of weight network of the first transformation model with m layers of weight network in a plurality of layers of weight network of the second transformation model. The number of layers of the n layers of weight network and the m layers of weight network are different. n is a positive integer, and m is a positive integer. Optionally, the first transformation model and the second transformation model have the same or similar structure and have the same number of layers of weight network. The grafted transformation model is generated by splicing the last n layers of weight network of the first transformation model after the first m layers of weight network of the second transformation model. Optionally, the grafted transformation model has the same number of layers as the weight network of the first transformation model or the second transformation model. The grafted transformation model has the same or similar structure as the first transformation model or the second transformation model.

It should be noted that n is 2, 3, 4, 5, 6, 7, 8, 9, and the like. Optionally, the specific value of n is defined by those skilled in the art according to the actual needs, which is not limited herein. m is 2, 3, 4, 5, 6, 7, 8, 9, and the like. Optionally, the specific value of m is defined by those skilled in the art according to the actual needs, which is not limited herein.

Optionally, the sum of n and m is the number of layers of the weight network of the first transformation model or the second transformation model.

Figure 2:
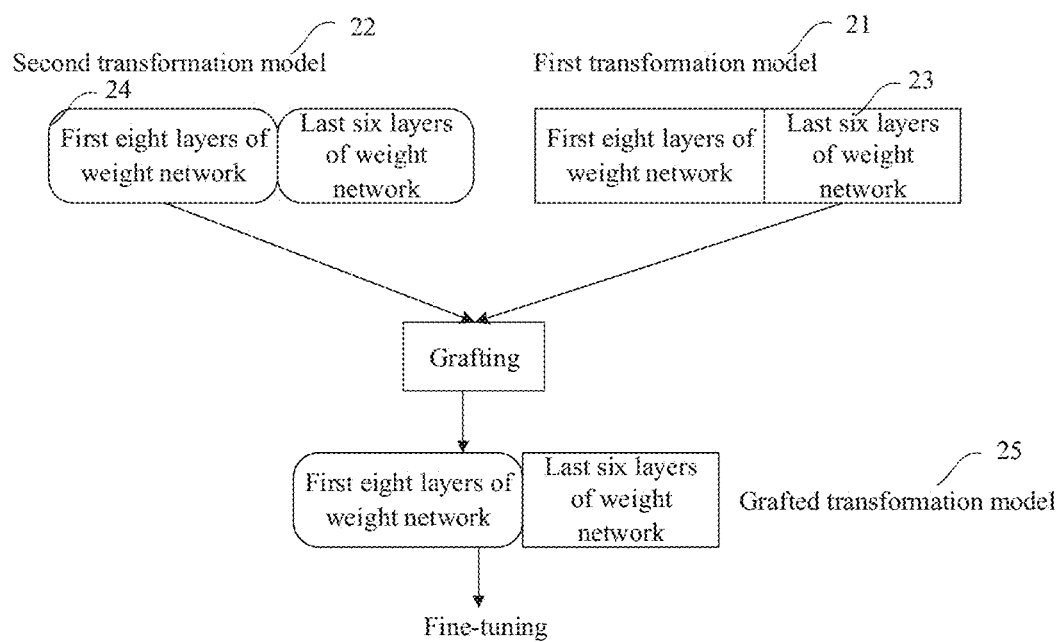
FIG. 2 is a schematic diagram of grafting models according to some embodiments of the present disclosure.

In some examples, as illustrated in FIG. 2, the first transformation model 21 and the second transformation model 22 have the same structure, and the weight networks of the two models both have 14 layers. The grafted transformation model 25 is acquired by splicing the last six layers of weight network 23 of the first transformation model 21 after the first eight layers of weight network 24 of the second transformation model 22.

In other embodiments, the grafted transformation model is generated by performing a summing or averaging or difference operation on weight parameters of the plurality of layers of weight network of the first transformation model and corresponding weight parameters of the plurality of layers of weight network of the second transformation model. Optionally, the first transformation model, the second transformation model, and the grafted transformation model have the same or similar structure, and the weight networks thereof have exactly the same structure and number of layers. In some examples, an $i^{th}$ weight parameter of the weight network of the grafted transformation model is acquired by performing the summing or averaging, or difference operation on an $i^{th}$ weight parameter of the weight network of the first transformation model and an $i^{th}$ weight parameter of the weight network of the second transformation model, wherein i is a positive integer; and the like, all weight parameters of the weight network of the grafted transformation model are acquired. Optionally, the summing operation is a weighted summing operation, and weight coefficients used to calculate the weight parameters of the weight network of the grafted transformation model are the same.

In step 105, an image generation model is generated based on the reconstruction model and the grafted transformation model.

Optionally, the image generation model is configured to transform an image to be transformed of the first style into a target image of the second style. In some embodiments, the image generation model is acquired by combining the reconstruction model with the grafted transformation model. The image to be transformed is an image of the first style, and the target image is an image of the second style. The target image is generated by inputting the image to be transformed into the image generation model, such that the image to be transformed is transformed from the first style to the second style, and thus the image to be transformed achieves the style transformation.

In some embodiments, step 105 includes the following sub-steps.
1. The combined transformation model is acquired by combining the reconstruction model with the grafted transformation model.
2. A fourth training sample set is acquired. The fourth training sample set includes at least one original image sample and an image of the second style corresponding to the at least one original image sample.
3. The image generation model is generated by fine-tuning the combined transformation model using the fourth training sample set.

In some embodiments, the combined transformation model is acquired by splicing the grafted transformation model and the reconstruction model; thereafter, the image generation model is acquired by fine-tuning a weight parameter of the combined transformation model by model training.

In summary, in the technical solutions according to the embodiments of the present disclosure, the first transformation model and the second transformation model are separately trained. The first transformation model has the advantage of well maintaining the target feature of the image, and the second transformation model has the advantage of generating the image of the second style in an impressive style. In the training process, the first transformation model and the second transformation model are trained separately for their own target advantage, and the grafted transformation model is generated by grafting the trained first transformation model and the trained second transformation model. The image generation model is generated based on the reconstruction model and the grafted transformation model. In this way, the complexity of the model training is greatly reduced, such that the required training samples and the times of iterations of the training are fewer, and thus the time cost of the model training is reduced.

Figure 3:
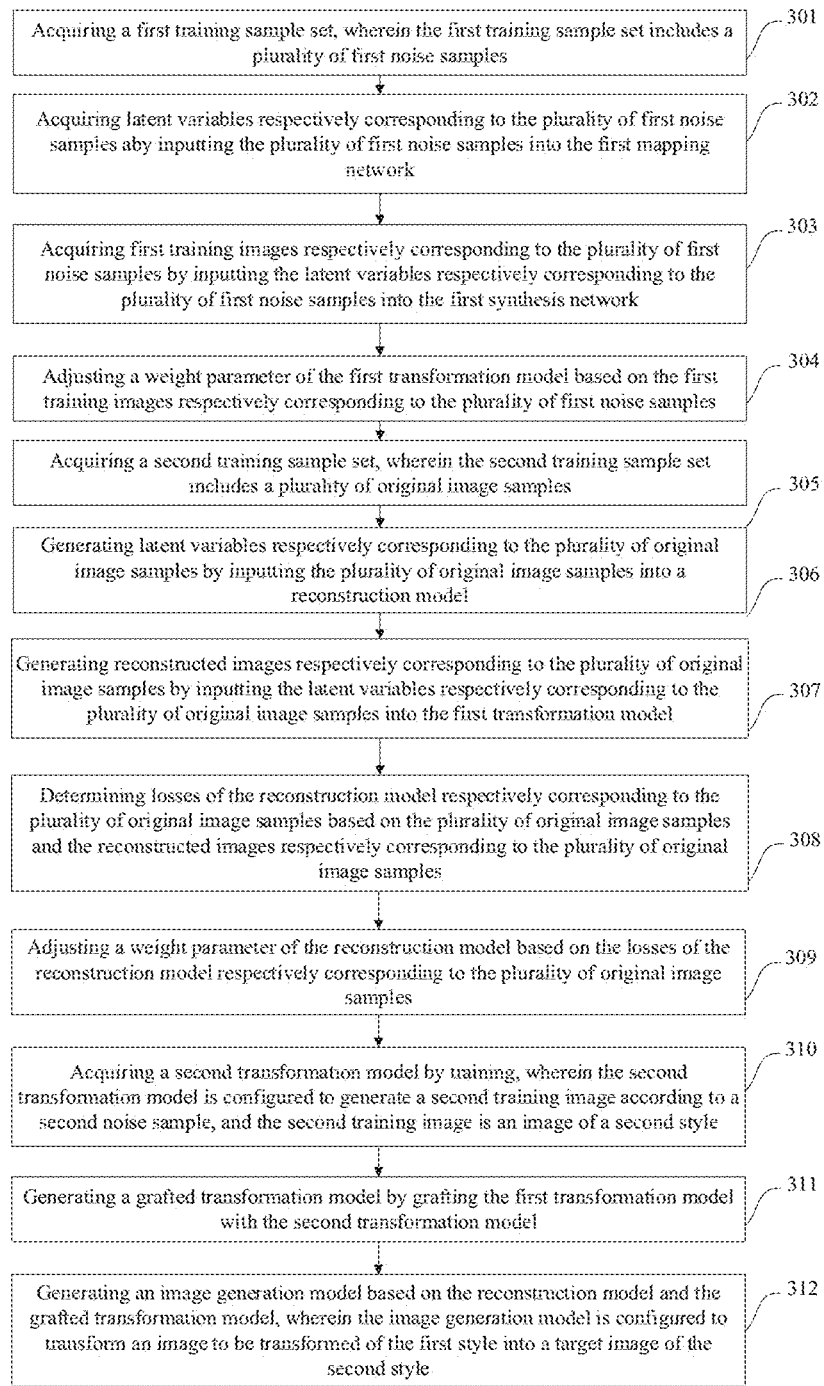
FIG. 3 is a flowchart of a method for training an image generation model according to some embodiments of the present disclosure.

FIG. 3 is a flowchart of a method for training an image generation model according to some embodiments of the present disclosure. Referring to FIG. 3, in the embodiments, the description is given using a scenario where the method is applicable to the computer device described above as an example. The method includes the following steps (step 301 to step 312).

In step 301, a first training sample set is acquired. The first training sample set includes a plurality of first noise samples.

Optionally, the first noise sample is a noise sample employed in training a first transformation model. In some embodiments, the first training sample set is acquired by generating a plurality of random first noise samples by a random noise generation function.

Figure 4:
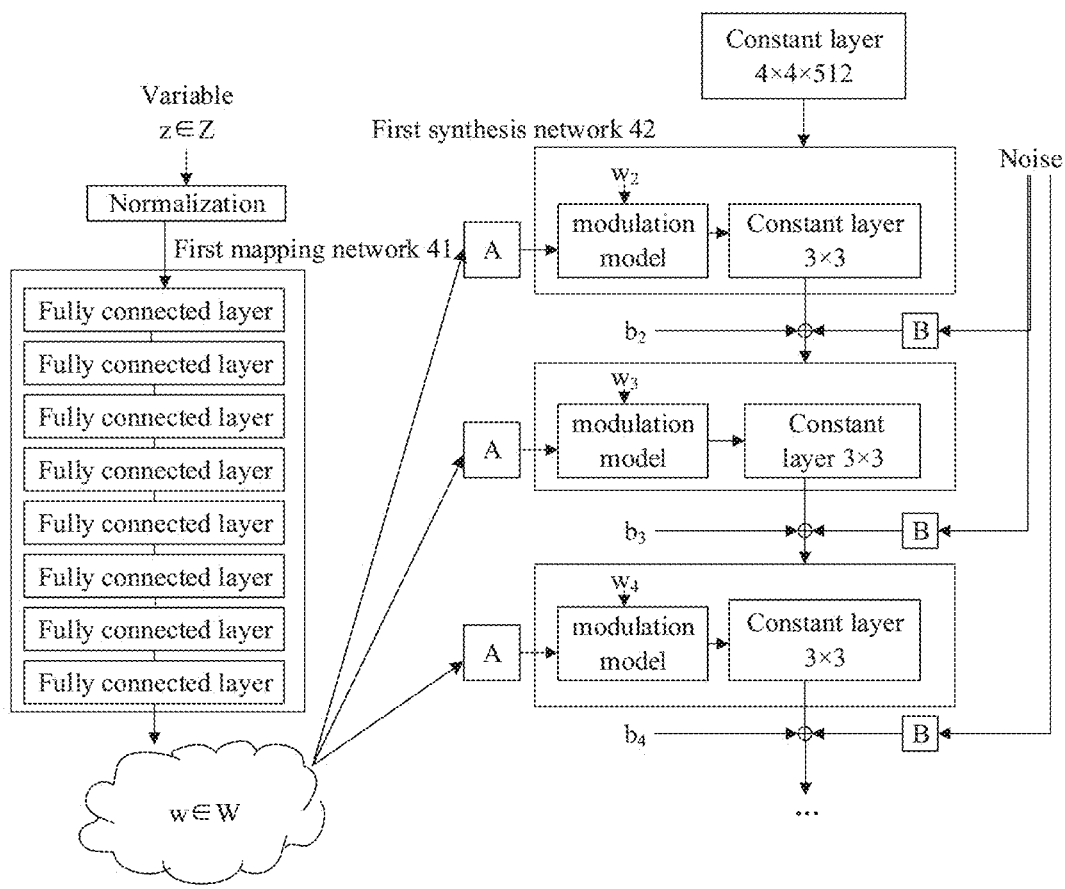
FIG. 4 is a schematic structural diagram of a first transformation model according to some embodiments of the present disclosure.

Optionally, the first transformation model is a style generative adversarial network-V2 (StyleGAN-V2) model. As illustrated in FIG. 4, the first transformation model includes a first mapping network 41 and a first synthesis network 42. The mapping network is capable of untwisting the input. The first mapping network 41 includes eight fully connected layers (FC). The first synthesis network 42 includes at least one learnable affine transformation layer, at least one modulation model (mod-demod), at least one up-sample layer, at least one constant layer, and at least one noise parameter layer. Optionally, the modulation model uses a first equation, a second equation, and a third equation as follows for calculation.

$$w'_{ijk} = s_i \cdot w_{ijk} \qquad \text{First Equation}$$

$$\sigma_j = \sqrt{\sum_{i,k} w'^2_{ijk}} \qquad \text{Second Equation}$$

$$w''_{ijk} = w'_{ijk} / \sqrt{\sum_{i,k} w'^2_{ijk} + \in} \qquad \text{Third Equation}$$

i, j, and k indicate numerals of latent variables of the modulation model in different dimensions. $w_{ijk}$ indicates a latent variable numbered (i, j, k). $w'_{ijk}$ indicates a calculation result of the first equation. $\sigma_j$ indicates a calculation result of the second equation. $\in$ indicates a very small number. $w''_{ijk}$ indicates a calculation result of the third equation.

In some embodiments, the first transformation model includes the first mapping network and the first synthesis network.

In step 302, latent variables respectively corresponding to the plurality of first noise samples are acquired by inputting the plurality of first noise samples into the first mapping network.

In some embodiments, the first mapping network includes a plurality of fully connected layers. The plurality of first noise samples are processed by the plurality of fully connected layers upon being input into the first mapping network. Then the latent variables respectively corresponding to the plurality of first noise samples are acquired.

In step 303, first training images respectively corresponding to the plurality of first noise samples are acquired by inputting the latent variables respectively corresponding to the plurality of first noise samples into the first synthesis network.

In some embodiments, after the latent variables respectively corresponding to the plurality of first noise samples have been affine transformed, modulated, and up-sampled in the first synthesis network upon being input into the first synthesis network, the first training images respectively corresponding to the plurality of first noise samples are acquired.

In step 304, based on the first training images respectively corresponding to the plurality of first noise samples, a weight parameter of the first transformation model is adjusted.

Optionally, upon acquiring the first training images respectively corresponding to the plurality of first noise samples, the weight parameter of the first transformation model is adjusted by discrimination results of the first training images respectively corresponding to the plurality of first noise samples.

In some embodiments, the first transformation model includes a first discrimination network. Step 304 further includes the following sub-steps.

1. First discrimination losses respectively corresponding to the plurality of first noise samples are acquired by inputting the first training images respectively corresponding to the plurality of first noise samples into the first discrimination network.
2. The weight parameter of the first transformation model is adjusted based on the first discrimination losses respectively corresponding to the plurality of first noise samples.

In this implementation, the first training images respectively corresponding to the plurality of first noise samples are discriminated using the first discrimination network in the first transformation model, and the generation qualities of the first training images respectively corresponding to the plurality of first noise samples are determined, such that the first discrimination losses respectively corresponding to the plurality of first noise samples are determined. Based on this, the weight parameter of the transformation model is adjusted. Optionally, in adjusting the weight parameter of the transformation model, a weight parameter of the first discrimination network is also adjusted. Optionally, the first discrimination network is a generative adversarial network (GAN), and the first discrimination loss is expressed as GAN loss.

In some examples, the first training image is a face image simulated based on the first noise sample, and the first discrimination network is configured to discriminate a probability that the first training image conforms to a real face image. For example, the more complete the face in the first training image, the smaller the first discrimination loss; and for example, the closer the ratio of the facial features of the face in the first training image is to the ratio of the facial features in the real face, the smaller the first discrimination loss is.

In some embodiments, upon the completion of the training of the first transformation model, the first mapping network of the first transformation model is removed, and the rest of the first transformation model other than the first mapping network is determined as the first transformation model.

In step 305, a second training sample set is acquired. The second training sample set includes a plurality of original image samples.

Optionally, the original image sample is an image of a first style. In some embodiments, the original image sample is an unprocessed real face image.

In step 306, latent variables respectively corresponding to the plurality of original image samples are generated by inputting the plurality of original image samples into a reconstruction model.

In some embodiments, upon being input into the reconstruction model, the plurality of original image samples are separately encoded by the reconstruction model, and the reconstruction model generates the latent variables respectively corresponding to the plurality of original image samples.

Figure 5:
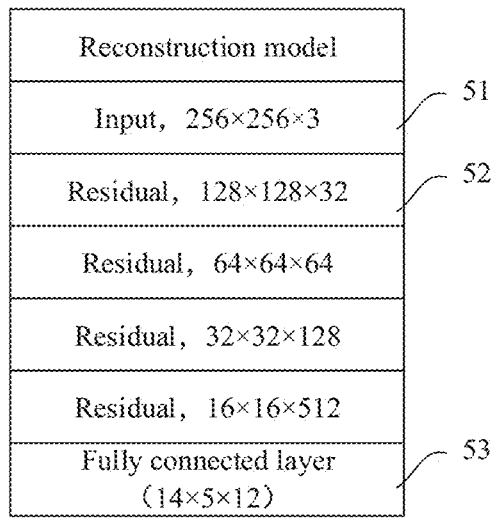
FIG. 5 is a schematic structural diagram of a reconstruction model according to some embodiments of the present disclosure.

In some examples, as illustrated in FIG. 5, the reconstruction model includes an input layer 51, a plurality of residual network (resblock) layers 52, and a fully connected layer 53.

In step 307, reconstructed images respectively corresponding to the plurality of original image samples are generated by inputting the latent variables respectively corresponding to the plurality of original image samples into the first transformation model.

In some embodiments, the reconstructed images respectively corresponding to the plurality of original image samples are generated by directly inputting the latent variables respectively corresponding to the plurality of original image samples into the first synthesis network of the first transformation model. Optionally, the plurality of original image samples and the reconstructed images respectively corresponding to the plurality of original image samples are images of the first style.

It should be noted that in training the reconstruction model, the first transformation model is a model that has been trained and parameters of the first transformation model do not change.

In step 308, losses of the reconstruction model respectively corresponding to the plurality of original image samples are determined based on the plurality of original image samples and the reconstructed images respectively corresponding to the plurality of original image samples.

In some embodiments, a plurality of sub-losses in the loss of the reconstruction model are determined based on the plurality of original image samples and outputs of the reconstructed images respectively corresponding to the plurality of original image samples in networks or functions.

In some embodiments, step 308 further includes the following sub-steps.

1. A first sub-loss is determined based on an output result acquired by inputting each of the reconstructed images respectively corresponding to the plurality of original image samples into the first discrimination network. The first sub-loss indicates a first characterization of the reconstructed image.

Optionally, the first characterization is a degree of conformity of the reconstructed image to a feature that the reconstructed image needs to contain. In some examples, in the case that the reconstructed image is a face image, the first characterization is a degree of conformity of the reconstructed image to the facial feature. The closer the face in the reconstructed image is to a real face, the smaller the first sub-loss is.

2. A second sub-loss is determined based on an output result acquired by inputting each of the plurality of original image samples and each of the reconstructed images respectively corresponding to the plurality of original image samples into a perceptual network. The second sub-loss indicates a first degree of conformity of the original image sample to the reconstructed image corresponding to the original image sample with respect to a target feature.

Optionally, whether the reconstructed image is an image generated according to an original image sample is determined based on the target feature. In some examples, the target feature is a face identification feature, and the face identification feature is configured to distinguish different faces. A probability that the original image sample and the reconstructed image corresponding to the original image sample are face images of the same person is determined by comparing a face identification feature in the original image sample to a face identification feature in the reconstructed image corresponding to the original image sample by the perceptual network, such that the second sub-loss is determined. Optionally, the second sub-loss is a perceptual loss. Optionally, the second sub-loss is calculated with reference to a fourth equation as follows.

$$\text{Perceptual loss}=E((VGG(x)-VGG(G(x)))^2) \quad \text{Fourth equation}$$

Perceptual loss indicates the second sub-loss. x indicates the original image sample. $VGG(x)$ indicates an output result acquired by inputting the original image sample into a visual geometry group network-16 (VGG-16). $G(x)$ indicates the reconstructed image corresponding to the original image sample. $VGG(G(x))^2$ indicates an output result acquired by inputting the reconstructed image corresponding to the original image sample into the VGG-16.

3. A third sub-loss is determined based on an output result acquired by inputting each of the plurality of original image samples and each of the reconstructed images respectively corresponding to the plurality of original image samples into a regression function. The third sub-loss indicates a second degree of conformity of the original image sample to the reconstructed image corresponding to the original image sample with respect to the target feature.

Optionally, the regression function is an L1 function or an L2 function. The third sub-loss is determined by the output result acquired by inputting the original image sample and the reconstructed image corresponding to the original image sample into the L function. Optionally, the third sub-loss is expressed as L 1 loss. Optionally, the third sub-loss is calculated with reference to a fifth equation as follows.

$$L1\_\text{loss}=E(x-G(x)) \quad \text{Fifth equation:}$$

L1_loss indicates the third sub-loss. x indicates the original image sample. $VGG(x)$ indicates the output result acquired by inputting the original image sample into the VGG-16.

4. The loss of the reconstruction model is determined based on the first sub-loss, the second sub-loss, and the third sub-loss.

In some examples, the loss of the reconstruction model is calculated by directly summing or weighted summing the first sub-loss, the second sub-loss, and the third sub-loss. In some embodiments, in weighted summing the first sub-loss, the second sub-loss, and the third sub-loss, values of weights respectively corresponding to the first sub-loss, the second sub-loss, and the third sub-loss are defined by those skilled in the art according to the actual needs, which are not limited herein.

In some examples, the loss of the reconstruction model is calculated with reference to a sixth equation as follows.

$$\text{Loss}=GAN_{loss}+\text{Perceptual loss}+L1_{loss} \quad \text{Sixth equation:}$$

Loss indicates the loss of the reconstruction model. GAN loss indicates the first sub-loss. Perceptual loss indicates the second sub-loss. L1_loss indicates the third sub-loss.

In step 309, a weight parameter of the reconstruction model is adjusted based on the losses of the reconstruction model respectively corresponding to the plurality of original image samples.

Optionally, based on the losses of the reconstruction model respectively corresponding to the plurality of original image samples, the weight parameter of the reconstruction model is adjusted, such that the loss of the reconstruction model is as small as possible. In some embodiments, when the times of iterative training reach a predetermined number of times, the training of the reconstruction model is completed. In other embodiments, in the case that the losses of the reconstruction model are continuously less than a reconstruction loss threshold, the training of the reconstruction model is complete. Optionally, the specific value of the reconstruction loss threshold is defined by those skilled in the art according to the actual needs, which is not limited herein.

In step 310, a second transformation model is acquired by training. The second transformation model is configured to generate a second training image according to a second noise sample. The second training image is an image of a second style.

The content of step 310 is the same or similar to the contents of steps 301 to 304 in the embodiments of the present disclosure, which is not described herein any further.

In step 311, a grafted transformation model is generated by grafting the first transformation model with the second transformation model.

The content of step 311 is the same or similar to the content of step 104 in the embodiments described above, which is not described herein any further.

In step 312, an image generation model is generated based on the reconstruction model and the grafted transformation model. The image generation model is configured to transform an image to be transformed of the first style into a target image of the second style.

The content of step 312 is the same or similar to the content of step 105 in the embodiments described above, which is not described herein any further.

In summary, in the technical solutions according to the embodiments of the present disclosure, the first transformation model is acquired first by training, and then the reconstruction model is acquired by training based on the first transformation model. In this way, the time required to train the reconstruction model is reduced, such that the overall time cost of the model training is further reduced.

In the embodiments of the present disclosure, the weight parameter of the first transformation model that has been completely trained is determined as the initial parameter of the second transformation model when training, such that the second transformation model is capable of retaining some of the characteristics of the first transformation model, which is convenient for improving the compatibility between the first transformation model and the second transformation model upon grafting.

Figure 6:
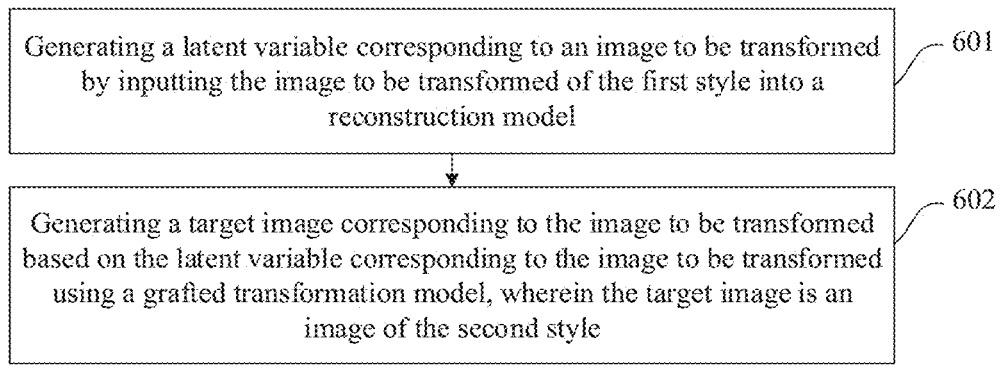
FIG. 6 is a flowchart of a method for generating images according to some embodiments of the present disclosure.

A method for generating images according to some embodiments of the present disclosure is described hereinafter in conjunction with FIG. 6 and FIG. 7. In the embodiments, the description is given using a scenario where the method is applicable to the computer device described above as an example. As illustrated in FIG. 6, the method includes the following steps (step 601 to step 602).

Figure 7:
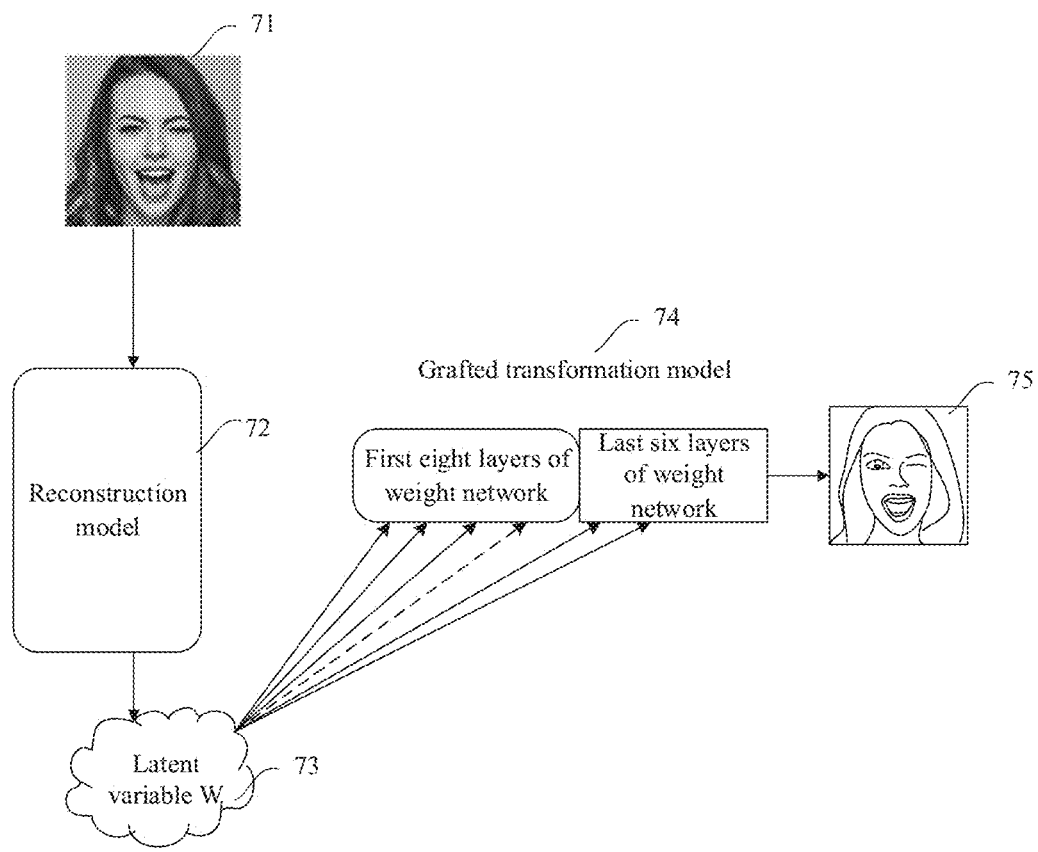
FIG. 7 is a schematic diagram of a method for generating images according to some embodiments of the present disclosure.

In step 601, as illustrated in FIG. 7, a latent variable 73 corresponding to an image to be transformed 71 is generated by inputting the image to be transformed 71 of the first style into a reconstruction model 72.

Optionally, the image to be transformed 71 is an unprocessed real face image.

In step 602, a target image 75 corresponding to the image to be transformed 71 is generated based on the latent variable 73 corresponding to the image to be transformed 71 using a grafted transformation model 74. The target image 75 is an image of the second style.

Optionally, the grafted transformation model 74 is a model generated by grafting a first transformation model with a second transformation model. The first transformation model is configured to generate a first training image according to a first noise sample, wherein the first training image is an image of the first style. The second transformation model is configured to generate a second training image according to a second noise sample, wherein the second training image is an image of the second style.

In some embodiments, a weight network, which is from the second transformation model, in the grafted transformation model 74 first stylizes the image to be transformed 71 based on the latent variable 73 corresponding to the image to be transformed 71, such that the image to be transformed 71 is transformed into an image of the second style. Thereafter, a weight network, which is from the first transformation model, of the grafted transformation model 74 adjusts a target feature in the stylized image to be transformed 71, such that a final target image 75 is acquired. For the description of the target features, reference may be made to step 308 in the embodiments of FIG. 3 above, which is not described herein any further.

In summary, in the technical solutions according to the embodiments of the present disclosure, the target image 75 is generated by the image generation model acquired by grafting the first transformation model with the second transformation model. The image generation model (the grafted transformation model 74) has both the advantage of the first transformation model in well maintaining the target feature of the image and the advantage of the second transformation model in generating the image of the second style which is an impressive style. Therefore, the image generation model is capable of generating the target image 75 in an impressive style under the premise of well maintaining the target feature of the image to be transformed, which improves the transformation effect of the image generation model.

Apparatus embodiments of the present disclosure used to perform the method embodiments of the present disclosure are described hereinafter. For details not disclosed in the apparatus embodiments of the present disclosure, reference may be made to the method embodiments of the present disclosure, which are not described herein any further.

Figure 8:
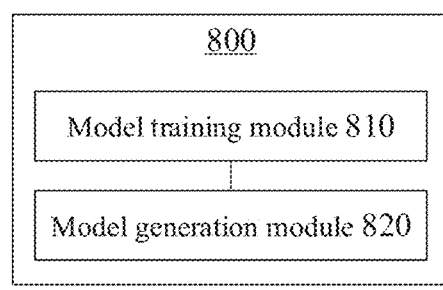
FIG. 8 is a block diagram of an apparatus for training an image generation model according to some embodiments of the present disclosure.

FIG. 8 is a block diagram of an apparatus for training an image generation model according to some embodiments of the present disclosure. Referring to FIG. 8, the apparatus has a function for practicing the above embodiments illustrating the method for training the image generation model. The function is implemented by hardware or is implemented by hardware executing corresponding software. The apparatus 800 includes a model training module 810 and a model generation module 820.

The model training module 810 is configured to acquire a first transformation model by training. The first transformation model is configured to generate a first training image according to a first noise sample. The first training image is an image of a first style.

The model training module 810 is further configured to acquire a reconstruction model by training based on the first transformation model. The reconstruction model is configured to map an original image sample to a latent variable corresponding to the original image sample.

The model training module 810 is further configured to acquire a second transformation model by training. The second transformation model is configured to generate a second training image according to a second noise sample. The second training image is an image of a second style.

The model generation module 820 is configured to generate a grafted transformation model by grafting the first transformation model with the second transformation model.

The model generation module 820 is further configured to generate the image generation model based on the reconstruction model and the grafted transformation model. The image generation model is configured to transform an image to be transformed of the first style into a target image of the second style.

In summary, in the technical solutions according to the embodiments of the present disclosure, the first transformation model and the second transformation model are separately trained. The first transformation model has the advantage of well maintaining the target feature of the image, and the second transformation model has the advantage of generating the image of the second style which is an impressive style. In the training process, the first transformation model and the second transformation model are trained separately for their own target advantage, and the grafted transformation model is generated by grafting the trained first transformation model and the trained second transformation model. The image generation model is generated based on the reconstruction model and the grafted transformation model. In this way, the complexity of the model training is greatly reduced, such that the required training samples and the times of iterations of the training are fewer, and thus the time of the model training is decreased.

Figure 9:
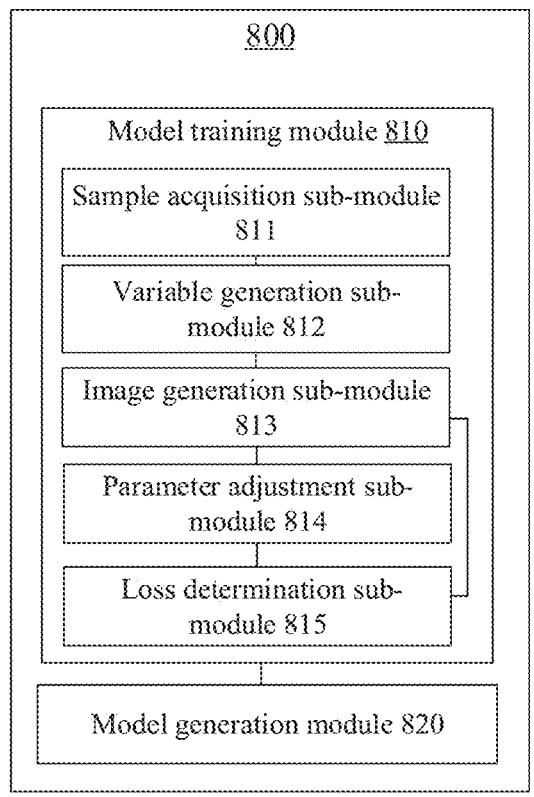
FIG. 9 is a block diagram of an apparatus for training an image generation model according to some embodiments of the present disclosure.

In some exemplary embodiments, the first transformation model includes a first mapping network and a first synthesis network. As illustrated in FIG. 9, the model training module 810 includes a sample acquisition sub-module 811, a variable generation sub-module 812, an image generation sub-module 813, and a parameter adjustment sub-module 814.

The sample acquisition sub-module 811 is configured to acquire a first training sample set. The first training sample set includes a plurality of first noise samples.

The variable generation sub-module 812 is configured to acquire latent variables respectively corresponding to the plurality of first noise samples by inputting the plurality of first noise samples into the first mapping network.

The image generation sub-module 813 is configured to acquire first training images respectively corresponding to the plurality of first noise samples by inputting the latent variables respectively corresponding to the plurality of first noise samples into the first synthesis network.

The parameter adjustment sub-module 814 is configured to adjust a weight parameter of the first transformation model based on the first training images respectively corresponding to the plurality of first noise samples.

In some exemplary embodiments, the first transformation model includes a first discrimination network. As illustrated in FIG. 9, the parameter adjustment sub-module 814 is configured to:

acquire first discrimination losses respectively corresponding to the plurality of first noise samples by inputting the first training images respectively corresponding to the plurality of first noise samples into the first discrimination network; and adjust the weight parameter of the first transformation model based on the first discrimination losses respectively corresponding to the plurality of first noise samples.

In some exemplary embodiments, as illustrated in FIG. 9, the model training module 810, includes a loss determination sub-module 815.

The sample acquisition sub-module 811 is further configured to acquire a second training sample set. The second training sample set includes a plurality of original image samples.

The variable generation sub-module 812 is further configured to generate latent variables respectively corresponding to the plurality of original image samples by inputting the plurality of original image samples into the reconstruction model.

The image generation sub-module 813 is further configured to generate reconstructed images respectively corresponding to the plurality of original image samples by inputting the latent variables respectively corresponding to the plurality of original image samples into the first transformation model. The plurality of original image samples and the reconstructed images respectively corresponding to the plurality of original image samples are images of the first style.

The loss determination sub-module 815 is configured to determine, based on the plurality of original image samples and the reconstructed images respectively corresponding to the plurality of original image samples, losses of the reconstruction model respectively corresponding to the plurality of original image samples.

The parameter adjustment sub-module 814 is further configured to adjust the weight parameter of the reconstruction model based on the losses of the reconstruction model respectively corresponding to the plurality of original image samples.

In some exemplary embodiments, the first transformation model includes the first discrimination network. The loss determination sub-module 815, as illustrated in FIG. 9, is configured to:

determine a first sub-loss based on an output result acquired by inputting each of the reconstructed images respectively corresponding to the plurality of original image samples into the first discrimination network, wherein the first sub-loss indicates a first characterization of the reconstructed image;

determine a second sub-loss based on an output result acquired by inputting each of the plurality of original image samples and each of the reconstructed images respectively corresponding to the plurality of original image samples into a perceptual network, wherein the second sub-loss indicates a first degree of conformity of the original image sample to the reconstructed image corresponding to the original image sample with respect to a target feature;

determine a third sub-loss based on an output result acquired by inputting each of the plurality of original image samples and each of the reconstructed images respectively corresponding to the plurality of original image samples into a regression function, wherein the third sub-loss indicates a second degree of conformity of the original image sample to the reconstructed image corresponding to the original image sample with respect to the target feature; and determine the loss of the reconstruction model based on the first sub-loss, the second sub-loss, and the third sub-loss.

In some exemplary embodiments, during the training process, an initial weight parameter of the second transformation model is the weight parameter of the first transformation model.

In some exemplary embodiments, the model generation module 820 is configured to generate the grafted transformation model by grafting n layers of weight network in a plurality of layers of weight network of the first transformation model with m layers of weight network in a plurality of layers of weight network of the second transformation model, wherein layers of the n layers of weight network and the m layers of weight network are different, n is a positive integer, and m is a positive integer; or to generate the grafted transformation model by performing a summing or averaging or difference operation on weight parameters of the plurality of layers of weight network of the first transformation model and corresponding weight parameters of the plurality of layers of weight network of the second transformation model.

In some exemplary embodiments, the model generation module 820 is configured to:

acquire a combined transformation model by combining the reconstruction model and the grafted transformation model;

acquire a fourth training sample set, wherein the fourth training sample set includes at least one original image sample and an image of the second style corresponding to the at least one original image sample; and generate the image generation model by fine-tuning the combined transformation model using the fourth training sample set.

Figure 10:
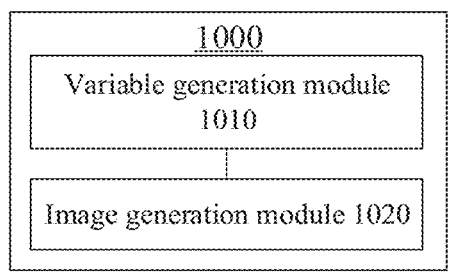
FIG. 10 is a block diagram of an apparatus for generating images according to some embodiments of the present disclosure.

FIG. 10 is a block diagram of an apparatus for generating images according to some embodiments of the present disclosure. Referring to FIG. 10, the apparatus has a function for practicing the above embodiments illustrating the method for generating the images. The function is implemented by hardware or by hardware executing corresponding software. The apparatus 1000 includes a variable generation module 1010 and an image generation module 1020.

The variable generation module 1010 is configured to generate a latent variable corresponding to an image to be transformed by inputting the image to be transformed of the first style into a reconstruction model.

The image generation module 1020 is configured to generate, based on the latent variable corresponding to the image to be transformed, a target image corresponding to the image to be transformed using a grafted transformation model. The target image is an image of the second style. The grafted transformation model is a model generated by grafting a first transformation model with a second transformation model. The first transformation model is configured to generate an image of the first style according to a first noise sample, and the second transformation model is configured to generate an image of the second style according to a second noise sample.

In summary, in the technical solutions according to the embodiments of the present disclosure, the target image is generated by the image generation model acquired by grafting the first transformation model with the second transformation model. The image generation model (the grafted transformation model) has both the advantage of the first transformation model in well maintaining the target feature of the image and the advantage of the second transformation model in generating the image of the second style which is an impressive style. Therefore, the image generation model is capable of generating the target image in an impressive style under the premise of well maintaining the target feature of the image to be transformed, which improves the transformation effect of the image generation model.

It should be noted that description is only given to the division of the functional modules for the apparatus according to the above embodiments. In practice, the functions of the apparatus may be assigned to and implemented by different functional modules according to actual needs. That is, in terms of internal structure, the apparatus is divided into different functional modules to implement a part or all of the functions as described above. In addition, the apparatus according to the above embodiments is based on the same concept as the method embodiments as described above, and the specific implementation process of the apparatus is detailed in the method embodiments, which is not described herein any further.

In some exemplary embodiments, a computer device is provided. The computer device includes a processor and a memory, wherein the memory stores one or more computer programs therein. The one or more computer programs, when loaded and run by the processor of the computer device, cause the computer device to perform the method for training the image generation model as described above.

In some exemplary embodiments, a computer device is provided. The computer device includes a processor and a memory, wherein the memory stores one or more computer programs therein. The one or more computer programs, when loaded and run by the processor of the computer device, cause the computer device to perform the method for generating the images as described above.

In some exemplary embodiments, a computer-readable storage medium is provided. The computer-readable storage medium stores one or more computer programs therein. The one or more computer programs, when loaded and run by a processor, cause the processor to perform the method for training the image generation model as described above.

In some exemplary embodiments, a computer-readable storage medium is provided. The computer-readable storage medium stores one or more computer programs therein. The one or more computer programs, when loaded and run by a processor, cause the processor to perform the method for generating the images as described above.

In some exemplary embodiments, a computer program product is provided. The computer program product, when loaded and executed by a processor, causes the processor to perform the method for training the image generation model as described above.

In some exemplary embodiments, a computer program product is provided. The computer program product, when loaded and executed by a processor, causes the processor to perform the method for generating the images as described above.

It should be noted that the term "a plurality of" herein refers to two or more. The symbol "l" generally denotes an "OR" relationship between contextual objects.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A method for training an image generation model, comprising:
   acquiring a first transformation model by training, wherein the first transformation model is configured to generate a first training image according to a first noise sample, and the first training image is an image of a first style;
   acquiring a reconstruction model by training based on the first transformation model, wherein the reconstruction model is configured to map an original image sample to a latent variable corresponding to the original image sample;
   acquiring a second transformation model by training, wherein the second transformation model is configured to generate a second training image according to a second noise sample, and the second training image is an image of a second style;
   generating a grafted transformation model by grafting the first transformation model with the second transformation model; and
   generating the image generation model based on the reconstruction model and the grafted transformation model, wherein the image generation model is configured to transform an image to be transformed of the first style into a target image of the second style.

2. The method according to claim 1, wherein
the first transformation model comprises a first mapping network and a first synthesis network; and
acquiring the first transformation model by training comprises:
   acquiring a first training sample set, wherein the first training sample set comprises a plurality of first noise samples;
   acquiring latent variables respectively corresponding to the plurality of first noise samples by inputting the plurality of first noise samples into the first mapping network;

acquiring first training images respectively corresponding to the plurality of first noise samples by inputting the latent variables respectively corresponding to the plurality of first noise samples into the first synthesis network; and adjusting a weight parameter of the first transformation model based on the first training images respectively corresponding to the plurality of first noise samples.

3. The method according to claim 2, wherein the first transformation model comprises a first discrimination network; and adjusting the weight parameter of the first transformation model based on the first training images respectively corresponding to the plurality of first noise samples comprises:

acquiring first discrimination losses respectively corresponding to the plurality of first noise samples by inputting a plurality of first training images respectively corresponding to the plurality of first noise samples into the first discrimination network; and adjusting the weight parameter of the first transformation model based on the first discrimination losses respectively corresponding to the plurality of first noise samples.

4. The method according to claim 1, wherein acquiring the reconstruction model based on the first transformation model comprises:

acquiring a second training sample set, wherein the second training sample set comprises a plurality of original image samples;

generating latent variables respectively corresponding to the plurality of original image samples by inputting the plurality of original image samples into the reconstruction model;

generating reconstructed images respectively corresponding to the plurality of original image samples by inputting the latent variables respectively corresponding to the plurality of original image samples into the first transformation model, wherein the plurality of original image samples and the reconstructed images respectively corresponding to the plurality of original image samples are images of the first style;

determining losses of the reconstruction model respectively corresponding to the plurality of original image samples based on the plurality of original image samples and the reconstructed images respectively corresponding to the plurality of original image samples; and adjusting a weight parameter of the reconstruction model based on the losses of the reconstruction model respectively corresponding to the plurality of original image samples.

5. The method according to claim 4, wherein the first transformation model comprises a first discrimination network; and determining the losses of the reconstruction model respectively corresponding to the plurality of original image samples based on the plurality of original image samples and the reconstructed images respectively corresponding to the plurality of original image samples comprises:

determining a first sub-loss based on an output result acquired by inputting each of the reconstructed images respectively corresponding to the plurality of original image samples into the first discrimination network, wherein the first sub-loss indicates a first characterization of the reconstructed image;

determining a second sub-loss based on an output result acquired by inputting each of the plurality of original image samples and each of the reconstructed images respectively corresponding to the plurality of original image samples into a perceptual network, wherein the second sub-loss indicates a first degree of conformity of the original image sample to the reconstructed image corresponding to the original image sample with respect to a target feature;

determining a third sub-loss based on an output result acquired by inputting each of the plurality of original image samples and each of the reconstructed images respectively corresponding to the plurality of original image samples into a regression function, wherein the third sub-loss indicates a second degree of conformity of the original image sample to the reconstructed image corresponding to the original image sample with respect to the target feature; and determining the losses of the reconstruction model based on the first sub-loss, the second sub-loss, and the third sub-loss.

6. The method according to claim 1, wherein during a training process, an initial weight parameter of the second transformation model is a weight parameter of the first transformation model.

7. The method according to claim 1, wherein generating the grafted transformation model by grafting the first transformation model with the second transformation model comprises:

generating the grafted transformation model by grafting n layers of weight network in a plurality of layers of weight network of the first transformation model with m layers of weight network in a plurality of layers of weight network of the second transformation model; wherein layers of the n layers of weight network and the m layers of weight network are different, n is a positive integer, and m is a positive integer; or generating the grafted transformation model by performing a summing or averaging or difference operation on weight parameters of the plurality of layers of weight network of the first transformation model and corresponding weight parameters of the plurality of layers of weight network of the second transformation model.

8. The method according to claim 1, wherein generating the image generation model based on the reconstruction model and the grafted transformation model comprises:

acquiring a combined transformation model by combining the reconstruction model and the grafted transformation model;

acquiring a fourth training sample set, wherein the fourth training sample set comprises at least one original image sample and an image of the second style corresponding to the at least one original image sample; and generating the image generation model by fine-tuning the combined transformation model using the fourth training sample set.

9. A computer device for training an image generation model, comprising: a processor and a memory, the memory storing one or more computer programs therein, wherein the one or more computer programs, when loaded and run by the processor of the computer device, cause the computer device to perform;

acquiring a first transformation model by training, wherein the first transformation model is configured to generate a first training image according to a first noise sample, and the first training image is an image of a first style;

acquiring a reconstruction model by training based on the first transformation model, wherein the reconstruction model is configured to map an original image sample to a latent variable corresponding to the original image sample;

acquiring a second transformation model by training, wherein the second transformation model is configured to generate a second training image according to a second noise sample, and the second training image is an image of a second style;

generating a grafted transformation model by grafting the first transformation model with the second transformation model; and generating the image generation model based on the reconstruction model and the grafted transformation model, wherein the image generation model is configured to transform an image to be transformed of the first style into a target image of the second style.

10. The computer device according to claim 9, wherein the first transformation model comprises a first mapping network and a first synthesis network; and the one or more computer programs, when loaded and run by the processor of the computer device, cause the computer device to perform:
acquiring a first training sample set, wherein the first training sample set comprises a plurality of first noise samples;
acquiring latent variables respectively corresponding to the plurality of first noise samples by inputting the plurality of first noise samples into the first mapping network;
acquiring first training images respectively corresponding to the plurality of first noise samples by inputting the latent variables respectively corresponding to the plurality of first noise samples into the first synthesis network; and
adjusting a weight parameter of the first transformation model based on the first training images respectively corresponding to the plurality of first noise samples.

11. The computer device according to claim 10, wherein the first transformation model comprises a first discrimination network; and the one or more computer programs, when loaded and run by the processor of the computer device, cause the computer device to perform:
acquiring first discrimination losses respectively corresponding to the plurality of first noise samples by inputting a plurality of first training images respectively corresponding to the plurality of first noise samples into the first discrimination network; and
adjusting the weight parameter of the first transformation model based on the first discrimination losses respectively corresponding to the plurality of first noise samples.

12. The computer device according to claim 9, wherein the one or more computer programs, when loaded and run by the processor of the computer device, cause the computer device to perform:
acquiring a second training sample set, wherein the second training sample set comprises a plurality of original image samples;
generating latent variables respectively corresponding to the plurality of original image samples by inputting the plurality of original image samples into the reconstruction model;
generating reconstructed images respectively corresponding to the plurality of original image samples by inputting the latent variables respectively corresponding to the plurality of original image samples into the first transformation model, wherein the plurality of original image samples and the reconstructed images respectively corresponding to the plurality of original image samples are images of the first style;
determining losses of the reconstruction model respectively corresponding to the plurality of original image samples based on the plurality of original image samples and the reconstructed images respectively corresponding to the plurality of original image samples; and
adjusting a weight parameter of the reconstruction model based on the losses of the reconstruction model respectively corresponding to the plurality of original image samples.

13. The computer device according to claim 12, wherein the first transformation model comprises a first discrimination network; and the one or more computer programs, when loaded and run by the processor of the computer device, cause the computer device to perform:
determining a first sub-loss based on an output result acquired by inputting each of the reconstructed images respectively corresponding to the plurality of original image samples into the first discrimination network, wherein the first sub-loss indicates a first characterization of the reconstructed image;
determining a second sub-loss based on an output result acquired by inputting each of the plurality of original image samples and each of the reconstructed images respectively corresponding to the plurality of original image samples into a perceptual network, wherein the second sub-loss indicates a first degree of conformity of the original image sample to the reconstructed image corresponding to the original image sample with respect to a target feature;
determining a third sub-loss based on an output result acquired by inputting each of the plurality of original image samples and each of the reconstructed images respectively corresponding to the plurality of original image samples into a regression function, wherein the third sub-loss indicates a second degree of conformity of the original image sample to the reconstructed image corresponding to the original image sample with respect to the target feature; and
determining the losses of the reconstruction model based on the first sub-loss, the second sub-loss, and the third sub-loss.

14. The computer device according to claim 9, wherein during a training process, an initial weight parameter of the second transformation model is a weight parameter of the first transformation model.

15. A non-transitory computer-readable storage medium, storing one or more computer programs therein, wherein the one or more computer programs, when loaded and run by a processor, cause the processor to perform the method for training the image generation model as defined in claim 1.

16. A computer program product comprising a non-transitory computer-readable storage medium storing one or more computer programs that when loaded and executed by a processor, causes the processor to perform the method for training the image generation model as defined in claim 1.

17. A method for generating images, comprising:
generating a latent variable corresponding to an image to be transformed by inputting the image to be transformed of a first style into a reconstruction model; and generating, based on the latent variable corresponding to the image to be transformed, a target image corresponding to the image to be transformed using a grafted transformation model, wherein the target image is an image of a second style;

wherein the grafted transformation model is a model generated by grafting a first transformation model with a second transformation model, the first transformation model is configured to generate an image of the first style according to a first noise sample, and the second transformation model is configured to generate an image of the second style according to a second noise sample.

18. A computer device for generating the images, comprising: a processor and a memory, the memory storing one or more computer programs therein, wherein the one or more computer programs, when loaded and run by the processor of the computer device, cause the computer device to perform the method for generating the images as defined in claim 17.

19. A non-transitory computer-readable storage medium, storing one or more computer programs therein, wherein the one or more computer programs, when loaded and run by a processor, cause the processor to perform the method for generating the images as defined in claim 17.

20. A computer program product comprising a non-transitory computer-readable storage medium storing one or more computer programs that when loaded and executed by a processor, causes the processor to perform the method for generating the images as defined in claim 17.

* * * * *